United States Patent Office 2,780,516
Patented Feb. 5, 1957

2,780,516

CHEMICAL PURIFICATION OF URANIUM COMPOUNDS

Judd C. Nevenzel, Pasadena, Calif., assignor to the United States of America as represented by the United States Atomic Energy Commission No Drawing. Application June 12, 1947,
Serial No. 754,263

10 Claims. (Cl. 23—14.5)

This invention relates to a method of material purification and, more particularly, to a method of preparing compounds of uranium of very high purity.

Although there are a number of methods known for purifying uranium, at the time of this invention the prior art methods were not wholly satisfactory for the simple conversion of impure uranium to a product which is substantially pure and which can be used in neutronic reactors, isotopic analyses, instruments and the like.

Methods were especially sought for obtaining pure uranium sulfate for use in neutronic reactors as well as for use as an intermediate purification process in the preparation of pure uranium metal for many purposes. A method for preparing pure uranium oxide ($U_3O_8$) was also desired.

The primary object of this invention is to provide a simple, efficient direct process for preparing exceptionally pure uranium, particularly uranium sulfate and uranium oxide.

An additional object of this invention is to provide a simple, effective process for preparing compounds of uranium for isotopic analyses.

A further object of this invention is to provide an efficient process for preparing compounds of very pure uranium for neutronic reactors, for instruments, and for the like.

Still further objects and advantages of this invention will appear in the following description.

The objects of this invention are achieved by a unitary process which comprises chiefly three major steps: (1) an organic solvent extraction of uranium as hexavalent metal, (2) a uranium peroxide precipitation, and (3) an acetone-sulfate uranium complex precipitation.

More specifically, this process comprises extracting an acid solution containing the uranyl nitrate, impurities and a soluble nitrate with a solvent such as diethyl ether or the like, separating the solvent phase and transferring the uranium from the solvent phase to water, adding hydrogen peroxide to the solution at a pH within the range of 1.0 to 2.5, letting the solution stand at a low temperature, separating the uranium peroxide which is formed, heating the uranium peroxide, adding sulfuric acid to dissolve the resulting uranium trioxide, adding acetone to the solution to form a complex precipitate, dissolving the precipitate with excess hot water, and removing acetone and water by vaporization, thus obtaining substantially pure uranium sulfate.

The first major step in the method of this invention is the solvent extraction. Diethyl ether is used because, although the nitrates of the rare earths are somewhat soluble in ether, under certain conditions the solubility of these nitrates can be repressed to the point where an excellent separation of uranyl nitrate can be obtained. For example, in acid solutions containing only nitrate as the main anion (traces of other negative ions introduce no complications) uranium nitrate is about equally soluble in ether and water. However, in the method of the invention instead of merely extracting the uranium compounds with ether, advantage is taken of the fact that soluble nitrates such as calcium nitrate, ammonium nitrate and the like cause the uranium to be salted out of the water solution into the ether solution. The calcium nitrate is often used as such a salting out agent since substantially none of it is carried over by the ether and since it gives very efficient separation.

Other nitrates can be of course be used. Ammonium nitrate has been found to be very desirable since it does not introduce any additional metal impurities such as calcium as cations.

After the ether extraction has been completed using the desired salting-out agent, water is added to the ether solution, and the ether is evaporated by heating the solution slightly so as to transfer the uranyl nitrate to water solution. Continued extraction with pure water will also accomplish this transfer of the uranyl nitrate to the water solution. This exchange may also be carried out upon a plant scale using counter-current or continuous multiple extraction procedures.

It may be noted that whereas this step gives an excellent separation from the rare earths yielding a product which may be more than 99 percent pure and which contains as little as 0.2 part per million of rare earths, nevertheless it does not appreciably reduce the concentration of those elements such as chromium which are also extracted by the ether.

The second purification step in the method of this invention comprises the precipitation of uranium by the formation of an insoluble compound uranium peroxide in acid solutions according to the following reaction:

$$UO_2^{++} + H_2O_2 \rightleftharpoons UO_4 \downarrow + 2H^+$$

The purification step is based upon the fact that very few elements form insoluble peroxides in neutral or acid solutions and therefore hydrogen peroxide is an excellent specific reagent for uranium and perhaps the most readily available one. The reaction constant between uranyl ion, hydrogen peroxide and hydrogen ions determined by a number of preliminary laboratory tests is:

$$K = \frac{(UO_2^{++})(H_2O_2)}{(H^+)^2}$$

where K equals $3.8 \times 10^{-3}$  with an average deviation of $0.8 \times 10^{-3}$. Ferric ion somewhat interferes with this precipitation since it catalyzes the decomposition of the hydrogen peroxide. Substantial sulfate ion and substantial excess salts of sodium, barium and calcium definitely delay precipitation and prevent complete precipitation of the uranium peroxide. However, it has been found that the previous ether extraction carried out in step one reduces the concentration of these ions so that the uranium peroxide precipitation can be efficiently carried out.

In the peroxide precipitation step it is desirable to control the pH because a pH in the range of 1.0 to 2.5 gives a high yield of a precipitate which is easy to dissolve in the next step. If, however, the pH is below 1.0 the yield is low and the precipitate is difficult to dissolve. In like manner when the pH exceeds 2.5 the yield again decreases. The pH is therefore adjusted before the addition of the hydrogen peroxide. It is also necessary to repeat the pH adjustment after the addition of the 30 percent hydrogen peroxide because although the peroxide itself has a pH of 1.8 and is thus within the range of 1.0 to 2.5 the pH drops rapidly due to the formation of hydrogen ions as indicated by the equation hereinabove.

After the peroxide has been added the temperature of the solution is then reduced by freezing with Dry Ice or any similar manner for two reasons. First, the crystals of the frozen sample act as a seeding agent thus causing a very great increase in the rate of precipitation and making it possible to carry out the reaction within a reasonable time by eliminating characteristic supersaturation of the sample with the uranium present. Second, the solubility of the uranium peroxide is decreased at the lower temperature. This effect, however, is practically negligible under conditions used. The frozen solution is maintained in that condition for three hours to allow conversion to the uranium peroxide. The sample should be kept at less than 0° C. at all times after the peroxide has been added until the next step is carried out.

The frozen solution is then thawed and the uranium peroxide formed is filtered out of the solution and heated to about 350° C. It is important that the filter used be of such a nature that during the filtration and heating no new impurities are introduced. Experience has indicated that a fritted glass filter meets these requirements. This heating causes the conversion of the uranium peroxide to uranium trioxide. It is important to maintain the temperature carefully to prevent formation of some uranium oxide ($U_3O_8$) which would increase the time necessary to carry out the next step. The uranium trioxide is then dissolved in a slight excess of dilute sulfuric acid. The uranium trioxide dissolves readily in warm six normal sulfuric acid, but if any uranium oxide ($U_3O_8$) is present a much longer period of time is required to completely dissolve the mixture. A single peroxide precipitation will reduce the concentration a hundred-fold and will remove most of the remaining impurities such as chromium. Without the previous ether extraction step, however, impurities probably would have been present which would not only interfere with the precipitation but also would have left the product contaminated, e. g. with thorium or zirconium peroxide which would be precipitated with the uranium peroxide.

The third purification step in the method of this invention is the precipitation of uranium by mixing the uranium sulfate with acetone to precipitate the uranium as uranyl sulfate-acetone complex. The formula for this complex is thought to be $UO_2SO_4 \cdot (CH_3)_2CO \cdot 2H_2O$. The solubility varies considerably with the amount of acetone used per volume of uranium sulfate.

A measure of this may be obtained by allowing solutions containing different amounts of the uranyl sulfate-acetone complex to stand for about 48 hours in a constant temperature bath at 25° C. with shaking once each working hour. At the end of this period an aliquot is taken and filtered through a sintered glass disc directly into a crucible. The aliquot is evaporated to dryness on the steam bath, the sulfuric acid is evaporated at 200° C., and the aliquot is then ignited at about 955° C. for one hour. The solubility of the uranyl sulfate-acetone complex is then calculated. Representative data obtained in this manner is shown in the following table.

*Table 1*

SOLUBILITY OF URANYL SULFATE-ACETONE COMPLEX

| No. | Medium | Solubility, Uranyl Sulfate-Acetone Complex (mg. per liter) |
|---|---|---|
| 1 | 2 volumes acetone—1 volume $H_2O$ | 1,217 |
| 2 | 4 volumes acetone—1 volume $H_2O$ | 158 |
| 3 | 8 volumes acetone—1 volume $H_2O$ | 23 |
| 4 | 8 volumes acetone—1 volume 1N $H_2SO_4$ | 73.5 |
| 5 | 8 volumes acetone—1 volume 6N $H_2SO_4$ | 215 |
| 6 | 8 volumes acetone—1 volume 12N $H_2SO_4$ | 254 |
| 7 | 8 volumes acetone—1 volume 1N $HNO_3$ | 701 |
| 8 | 8 volumes acetone—1 volume 6N $HNO_3$ | 2,490 |

As indicated by the solubility data a number of different mediums give a rather low solubility. In the preferred embodiment of the method of this invention a medium consisting of 8 parts of acetone per part of water is used. This results in a fine crystalline, easily filterable precipitate.

The uranium may be obtained in a highly purified state as uranium sulfate by dissolving the uranyl sulfate-acetone complex in excess hot water, and then crystallizing by vaporizing the acetone and water. The uranyl sulfate which is crystallized is thought to be represented by the formula $UO_2SO_4 \cdot 3\frac{1}{2}H_2O$. Instead of preparing the uranyl sulfate, uranium oxide ($U_3O_8$) may be obtained by heating the complex to 950° C. In either case the compound which is formed is in a highly purified state. It is, of course, possible to have the uranium compound in solution for use in other processes.

In the following example the preferred embodiment of this invention is presented for the purpose of illustrating the method of the invention but not for the purpose of limiting its scope.

EXAMPLE I

Ten grams of impure uranyl nitrate and about eighty grams of ammonium nitrate are dissolved in about 100 milliliters of 1 normal nitric acid. The solution is transferred to a continuous ether extraction (modified Soxhlet) apparatus containing about 250 milliliters of diethyl ether. Extraction is continued for five hours. At the end of this period the water and solvent phase are separated. Fifty milliliters of water are added to this ether solution and the ether evaporated off over a steam bath. The pH is adjusted to 1.3. Thirty percent excess hydrogen peroxide is added and the pH is again readjusted to 1.3. This solution is then frozen with Dry Ice and kept in that state for three hours. After thawing, the uranium peroxide ($UO_4$) formed is washed twice with fifty milliliters of water, filtered through a sintered heat resistant glass filter which is then dried in a drying oven for 1–2 hours at 110° C. and then ignited in a muffle furnace. It is then heated to about 350° C. for several hours. The heating operation effects the conversion of the uranium peroxide to the trioxide. The trioxide is then dissolved in about 25 milliliters of 6 normal sulfuric acid. The sulfate solution is mixed with about 200 milliliters of acetone to obtain the uranium as an insoluble uranyl sulfate-acetone complex. The complex is washed with about 100 milliliters of a solution consisting of 8 parts acetone and 1 part water, applied as a fine spray. After washing the complex is dissolved in about 1 liter of hot water. The uranium is obtained as pure uranium sulfate by evaporating the acetone and water. The uranium sulfate which is so crystallized is thought to be represented by the formula $UO_2SO_4 \cdot 3\frac{1}{2}H_2O$.

If it is desired to obtain the uranium as pure uranium oxide ($U_3O_8$) instead of as uranium sulfate this may be achieved by heating the uranium sulfate acetone complex for several hours at 950° C.

Although the details have been given very specifically in the example it is, of course, true that many possible variations of the invention may be used without departing from the spirit or scope thereof. For example, although diethyl ether has been indicated as the preferred solvent, other organic solvents may be used for this purpose including hexone, monoethyl ether of ethylene glycol, monoethyl ether of diethylene glycol, and the like. Similar modifications may be made within the scope of the invention.

What is claimed is:

1. The purification process which comprises extracting with an organic solvent a water solution containing impure uranyl nitrate and another soluble nitrate, replacing the organic solvent in the solvent phase with water, adding hydrogen peroxide to the resulting aqueous solution to form a uranium peroxide precipitate, separating the uranium peroxide, heating the peroxide to uranium trioxide, dissolving the trioxide in sulfuric acid and adding acetone to the solution to form a pure insoluble acetone-sulfate complex of uranium.

2. The purification process which comprises extracting with ether a water solution containing impure uranyl nitrate and another soluble nitrate, replacing the ether in the solvent phase with water, adding hydrogen peroxide to the resulting aqueous solution and cooling to a low temperature to form a uranium peroxide precipitate, separating the uranium peroxide, heating the peroxide to uraninum trioxide, dissolving the trioxide in sulfuric acid and adding acetone to the solution to form a pure insoluble acetone-sulfate complex of uranium.

3. The purification process which comprises extracting with an organic solvent a water solution containing impure uranyl nitrate and another soluble nitrate, replacing the organic solvent in the solvent phase with water, adding hydrogen peroxide to the resulting aqueous solution and cooling to a low temperature to form a uranium peroxide precipitate, separating the uranium peroxide, heating the peroxide to uranium trioxide, dissolving the trioxide in sulfuric acid, adding acetone to the solution to form a pure insoluble acetone-sulfate complex of uranium, separating the complex, dissolving the complex, and crystallizing uranium sulfate from the solution.

4. The purification process which comprises extracting with an organic solvent a water solution containing impure uranyl nitrate and another soluble nitrate, replacing the organic solvent in the solvent phase with water, adding hydrogen peroxide to the resulting aqueous solution and cooling to a low temperature to form a uranium peroxide precipitate, separating the uranium peroxide, heating the peroxide to uranium trioxide, dissolving the trioxide in sulfuric acid, adding acetone to the solution to form a pure insoluble acetone-sulfate complex of uranium.

5. The purification process which comprises extracting with an organic solvent a water solution containing impure uranyl nitrate and another soluble nitrate, replacing the organic solvent in the solvent phase with water, adding hydrogen peroxide to the aqueous solution while maintaining the pH between 1 and 2.5 to form a uranium peroxide precipitate, separating the uranium peroxide, heating the peroxide to uranium trioxide, dissolving the trioxide in sulfuric acid, adding acetone to the solution to form a pure insoluble acetone-sulfate complex of uranium.

6. The purification process which comprises extracting with ether a water solution containing impure uranyl nitrate and another soluble nitrate, replacing the ether in the solvent phase with water, adding hydrogen peroxide to the resulting aqueous solution to form a uranium peroxide precipitate, separating the uranium peroxide, heating the peroxide to uranium trioxide, dissolving the trioxide in sulfuric acid and adding acetone to the solution to form a pure insoluble acetone-sulfate complex of uranium.

7. The purification process which comprises extracting with ether a water solution containing impure uranyl nitrate and another soluble nitrate, replacing the ether in the solvent phase with water, adding hydrogen peroxide to the resulting aqueous solution and cooling to a low temperature to form a uranium peroxide precipitate, separating the uranium peroxide, heating the peroxide to uranium trioxide, dissolving the trioxide in sulfuric acid, adding acetone to the solution to form a pure insoluble acetone-sulfate complex of uranium, separating the complex, dissolving the complex, and crystallizing uranium sulfate from the solution.

8. The purification process which comprises extracting with ether a water solution containing impure uranyl nitrate and another soluble nitrate, replacing the ether in the solvent phase with water, adding hydrogen peroxide to the aqueous solution while maintaining the pH between 1 and 2.5 to form a uranium peroxide precipitate, separating the uranium peroxide, heating the peroxide to uranium trioxide, dissolving the trioxide in sulfuric acid, adding acetone to the solution to form a pure insoluble acetone-sulfate complex of uranium.

9. The purification process which comprises extracting with an organic solvent a water solution containing impure uranyl nitrate and another soluble nitrate, replacing the organic solvent in the solvent phase with water, forming a uranium peroxide precipitate by adding hydrogen peroxide to the resulting aqueous solution while cooling to a low temperature and maintaining the pH between 1 and 2.5, separating the uranium peroxide, heating the peroxide to uranium trioxide, dissolving the trioxide in sulfuric acid, adding acetone to the solution to form a pure insoluble acetone-sulfate complex of uranium.

10. The purification process which comprises extracting with ether a water solution containing impure uranyl nitrate and another soluble nitrate, replacing the ether in the solvent phase with water, forming a uranium peroxide precipitate by adding hydrogen peroxide to the resulting aqueous solution while cooling to a low temperature and maintaining the pH between 1 and 2.5, separating the uranium peroxide, heating the peroxide to uranium trioxide, dissolving the trioxide in sulfuric acid, adding acetone to the solution to form a pure insoluble acetone-sulfate complex of uranium.

References Cited in the file of this patent

Mellor, Inorganic and Theoretical Chemistry, Vol. 4, pages 119–20. Pub. in 1923 by Longmans, Green and Co., London; Copy in Division 59.